United States Patent [19]

Flowers

[11] 4,379,916

[45] Apr. 12, 1983

[54] METHOD FOR COPRECIPITATING WIRE COATING ENAMEL COMPOSITION

[75] Inventor: Ralph G. Flowers, Pittsfield, Mass.

[73] Assignee: General Electric Company

[21] Appl. No.: 269,338

[22] Filed: Jun. 1, 1981

[51] Int. Cl.$^3$ .................... C08L 61/04; B32B 15/02; C08L 61/00

[52] U.S. Cl. .................................. 528/494; 428/379; 528/491; 528/493; 528/495; 528/496; 524/94; 524/113; 525/58

[58] Field of Search ............... 528/491, 493, 494, 495, 528/496

[56] References Cited

U.S. PATENT DOCUMENTS 4,089,843  5/1978  Rausch, Jr. ..................... 528/494

*Primary Examiner*—C. A. Henderson
*Attorney, Agent, or Firm*—Robert A. Cahill

[57] ABSTRACT

Insulating wire coating enamels containing a mixture of polyvinyl acetal, phenolic and epoxy resins are prepared by precipitating the resins from a tetrahydrofuran solution with water. The precipitated resins are dried and electrostatically applied to transformer wire.

12 Claims, No Drawings

METHOD FOR COPRECIPITATING WIRE COATING ENAMEL COMPOSITION

BACKGROUND OF THE INVENTION

Three component insulating enamels for transformer wire are described in U.S. Pat. No. 4,215,174 and consist of a mixture of polyvinyl acetal, phenolaldehyde and epoxy resins. The patent discloses a three-component coating composition that reduces the amount of solvents when applied from a wet coating and improves the flow properties of the coating when applied by dry electrostatic techniques. The composition disclosed within the aforementioned U.S. patent is incorporated herein for purposes of reference.

U.S. patent application, Ser. No. 595,034, filed July 30, 1975, now abandoned and replaced by continuing application Ser. No. 697,838, filed June 21, 1976, now abandoned, in favor of appliction Ser. No. 103,080 filed Dec. 12, 1979 which issued as U.S. Pat. No. 4,277,534, describes the resin composition as well as the solvents employed in preparing the resins for application. Once the compositions are applied to transformer conductors, the solvent such as cresol, having a boiling point of approximately 200° C. must be evaporated. Because of the high boiling point involved, recovery of the solvent in a closed system can be quite expensive.

In order to insure homogeneous mixing between the three resin components for electrostatic powder applications, the materials must be processed by one of several methods. One method is to dissolve the resins in a solvent and use a spray-dry process wherein the resin solution is propelled through a nozzle into a heated container. In a more commonly employed method the component resins are intimately mixed by hot melt or extrusion techniques followed by cryogenic grinding to produce a homogenous powder with the desired particle size distribution.

The processing methods for insuring intimate mixtures between the resin components of the wire coating composition make the prior art processes quite expensive in a large-scale transformer wire processing operation. The purpose of this invention is to provide methods and materials for processing wire coating compositions manufactured from several different resins by an economic process which allows for near total recovery of the solvent employed in the coating formation process.

SUMMARY OF THE INVENTION

Wire coating enamels consisting of a mixture of polyvinyl acetal, phenolaldehyde and epoxy resins are prepared by precipitating the resins from a solvent solution with water. The resin solvent is chosen to have good solubility in the water to provide complete precipitation of the resins. The solvent has a low boiling point to provide for near total recovery in a closed system. One embodiment utilizes tetrahydrofuran having a boiling point of 66° C.

DESCRIPTION OF THE PREFERRED EMBODIMENT

Wire coating insulating enamels, having the composition described within the aforementioned U.S. patent application, were prepared for electrostatically applying to transformer conductor in the following examples.

EXAMPLE 1

A 26% solution of insulating enamel ingredients consisting of 4.7 parts by weight (pbw) polyvinyl acetal resin (Formvar 7/95, tradename of the Monsanto Chemical Co.) 2.5 pbw phenolic resin (CKM 2103 from the Union Carbide Corporation, 0.8 parts phenolic resin (CK 2400 from Union Carbide Corporation), 0.67 parts epoxy (Epon 815 from Shell Chemical Co.), 1.33 parts epoxy (DER 332 from Dow Chemical Company) and 0.025 parts zinc octoate catalyst was made in N-methylpyrrolidone (NMP) solvent was precipitated by stirring into a large volume of water. The recovered solid was air-dried prior to electrostatic application to transformer wire. The coated wire was tested and found to exhibit excellent electrical and physical properties. The NMP can be recovered from the NMP-water solution by conventional flash-evaporation, steam-stripping or fractional distillation techniques.

EXAMPLE 2

A 20% solution consisting of 44 parts polyvinyl acetal (Formvar 7/95), 30 parts phenolic resin (CK2103) and (CK2400), 13.3 parts epoxy resin (DER332), 6.7 epoxy resin (DER324), 6.0 parts epoxy resin (Epon 1004) and 0.4 parts zinc octoate catalyst (18% Zn) was made in tetrahydrofuran (THF). The solid composition was precipitated from the THF by slowly adding one quart of the solution to three gallons of water with vigorous stirring. The solid precipitant was then allowed to separate from the THF-water mixture by sedimentation and the THF-water was decanted for recovery of the THF from the water. The solid precipitant was purified by vigorous stirring with three gallons of water for 10 to 15 minutes. The product was filtered, dried and ground to the desired particle size in a pin mill at ambient temperatures. The powder was electrostatically applied to transformer conductor and resulted in an insulating coating having excellent electrical and physical properties. The THF-water mixture from the initial precipitation step contains 6–10% THF which can be economically fractionated to yield the 95% THF azeotrope which is usable as the solvent for the process.

EXAMPLE 3

A 20% solution consisting of 252.5 parts polyvinyl acetal (Formvar 7/95), 62.5 parts polyvinyl acetal (Formvar 15/95), 157.5 parts phenolic (CK 2103 ), 52.5 parts phenolic (CK 2400), 150 parts DER 332 epoxide, 75 parts Epon 1004 epoxide, 87.5 parts of a 70% benzyl alcohol solution of alkanol blocked polyisocyanate (KL5-7005 from the Mobay Chemical Co.) and 9.0 parts zinc octoate catalyst (18% Zn) was made in THF. The solidl composition was precipitated by adding to a large volume of water and processed in the same manner as in Example 2. This powder composition was applied to transformer wire by electrostatic coating techniques resulting in an insulating coating having excellent electrical and mechanical properties.

EXAMPLE 4

A 20% solution consisting of 4.4 parts polyvinyl acetal (Formvar 7/95E), 2.0 phenolic (CK 2103), 1.0 parts phenolic (CK 2400), 1.33 parts epoxy (DER 332), 0.67 parts DER 324, 0.6 parts Epon 1004, 0.06 parts zinc octoate catalyst (18% Zn) was made in THF. The powder composition was precipitated from the THF by slowly adding one part of the solution to twelve parts of cold water with good agitation. Ten-15 minutes were allowed for completing the precipitation process. After allow ing the solid precipitation to separate from the THF-water mixture, by sedimentation, the THF-water was decanted for recovery as described earlier. The product was washed, dried, and ground. It was then applied electrostatically to transformer wire. The resulting wire insulation had excellent electrical and physical properties.

EXAMPLE 5

A 22.8% solution of the coating mixture described in Example 5 was made in an azeotrope consisting of 95% THF and 5% water. The azeotrope was recovered from the solution prepared in Example 4 after allowing the precipitate to settle out from the THF-water mixture and recovering the THF-water azeotrope by distillation.

EXAMPLE 6

A 20% solution was prepared by dissolving 3.8 parts polyvinyl acetal (Formvar 6/95), 1.7 parts epoxy (Epon 1004), 1.7 parts epoxy (Araldite 6005 obtained from the Ciba Chemical Co.), 2.8 parts phenolic resin (CK 2103), 1.2 parts blocked polyisocyanate (Mondur type S obtained from the Mobay Chemical Co.), 0.3 parts melamine resin (Resemene 875 from the Monsanto Chemical Co.), 0.135 parts zinc octoate (18% Zn) in THF. One part of the solution was added slowly to 10 parts of water while being agitated in a mixer. After the solution was added to the water, mixing was allowed to stand for one hour. The solid precipitant was collected by filtration, air-dried, ground, and applied by electrostatic techniques to transformer wire. The resulting wire exhibited excellent electrical and mechanical characteristics.

EXAMPLE 7

A 20% solution was prepared containing the ingredients listed in Example 6 with the following exceptions: 0.85 parts Epon 1004 and 2.55 parts Araldite 6005. Before precipitating the solution in water, 0.03% by weight of a surfactant, Triton X100, which is a product of the Rome & Haas Chemical Company, was added to lower the surface tension of the water and to assist the precipitation process. The precipitated powder composition was processed as described in Example 2 and electrostatically applied to transformer wire by electrostatic techniques and was found to exhibit excellent electrical and physical properties.

The materials and methods of the examples listed indicate that precipitation of wire coating enamel mixtures from organic solvents that are soluble in water provides an economic means for intimately mixing wire coating materials without the need for extrusion and cryogenic grinding or wet spray drying techniques.

The water soluble solvent is recoverable from the water. The feasibility of reusing THF and water as an azeotrope for dissolving the wire coating enamel has also been proven.

What is claimed as new and which it is desired to secure by Letters Patent of the United States is:

1. Method for preparing a wire coating enamel consisting of a homogeneous mixture of phenolaldehyde, polyvinyl acetal and epoxy resins, said method comprising the steps of:
   dissolving the resin mixture in a water soluble, organic solvent to form a solution;
   mixing said solution in a volume of water greater than the volume of the solution to precipitate out said resins as a homogeneous mixture; and
   separating said precipitated resin mixture from said water and solvent mixture.

2. The method of claim 1 including the further step of separating said solvent from said water.

3. The method of claim 2 wherein said separation comprises fractional distillation.

4. The method of claim 3 wherein said fractional distillation comprises heating said water-solvent mixture to separate said solvent from said mixture.

5. The method of claim 4 wherein said separated solvent is in the form of an azeotrope containing less than 10 percent water.

6. The method of claim 1 wherein said organic solvent has a boiling point lower than water.

7. A method for forming wire coating enamel comprising the steps of:
   (a) dissolving a mixture of phenol aldehyde, polyvinyl acetal and epoxy resins in water soluble, organic solvent to form a solution;
   (b) mixing about one part of said solution into about 10 parts to about 12 parts of water to precipitate out said resins as a homogeneous mixture;
   (c) separating said precipitated resin mixture from the water-solvent mixture; and
   (d) heating said water-solvent mixture to form an azeotrope consisting of said water and said solvent, said azeotrope being reusable in step (a) for dissolving said resin mixture.

8. The method of claim 7 wherein said azeotrope comprises less than 10 percent of said water.

9. The method of claim 7 wherein said solvent comprises tetrahydrofuran.

10. The method of claim 1 wherein the volume of the solution to the volume of water to precipitate out the resins is about 1 part solution to about 10 to about 12 parts water.

11. A method of forming wire coating enamels comprising the steps of:
   dissolving a mixture of polyvinyl acetal, phenolic and epoxy resins in an azeotrope solution of tetrahydrofuran and water to form a resin solution;
   mixing about 1 part of said resin solution into about 10 to about 12 parts of water to precipitate out said resins as a homogeneous mixture; and
   separating said precipitated resin mixture from said azeotrope-water solution.

12. The method of claim 11 wherein said azeotrope comprises less than 10 percent water.

* * * * *